US009377758B1

(12) United States Patent
Kim

(10) Patent No.: US 9,377,758 B1
(45) Date of Patent: Jun. 28, 2016

(54) INCOHERENT DIGITAL HOLOGRAPHIC ADAPTIVE OPTICS

(71) Applicant: Myung Keun Kim, Tampa, FL (US)

(72) Inventor: Myung Keun Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 400 days.

(21) Appl. No.: 13/872,633

(22) Filed: Apr. 29, 2013

Related U.S. Application Data

(60) Provisional application No. 61/639,235, filed on Apr. 27, 2012.

(51) Int. Cl.
*G03H 1/08* (2006.01)
*G03H 1/04* (2006.01)
*G01B 9/02* (2006.01)
*G01B 9/021* (2006.01)

(52) U.S. Cl.
CPC ............. *G03H 1/0808* (2013.01); *G01B 9/021* (2013.01)

(58) Field of Classification Search
CPC .... G01B 11/2441; G01B 9/02; G01C 19/721; G01J 3/45; G01J 9/00; G01J 9/02; G01J 1/10; G01J 3/021; G01N 21/45; G01N 21/453; G01N 21/4795; G01N 2021/7779; G01N 21/01; G01D 5/35358
USPC ........... 359/9, 15, 19, 22, 24, 27, 34, 35, 580, 359/583, 900; 356/450, 457, 458, 460, 468, 356/469, 477, 482, 21, 139.01
See application file for complete search history.

(56) References Cited

U.S. PATENT DOCUMENTS

| 5,493,398 | A | * | 2/1996 | Pfister | ............... G01B 11/2441 |
| | | | | | 356/512 |
| 5,841,125 | A | * | 11/1998 | Livingston | ............. B23K 26/04 |
| | | | | | 250/201.9 |
| 7,808,712 | B2 | | 10/2010 | Scott et al. | |
| 2007/0030542 | A1 | * | 2/2007 | Grasso et al. | ..................... 359/9 |
| 2007/0278386 | A1 | | 12/2007 | Paxman et al. | |
| 2008/0055740 | A1 | | 3/2008 | Wagner et al. | |
| 2012/0257192 | A1 | | 10/2012 | Jiang | |
| 2012/0281223 | A1 | | 11/2012 | Mortimer | |

OTHER PUBLICATIONS

Changgeng Liu and Myung K. Kim, Digital holographic adaptive optics for ocular imaging: proof of principle, Optics Letters, vol. 36, No. 14, Jul. 15, 2011, pp. 2710-2712. Digital Holography and Microscopy Laboratory, Department of Physics, University of South Florida, Tampa, Florida.

Myung K. Kim, Full color natural light holographic camera, Digital Holography and Microscopy Laboratory, Department of Physics, University of South Florida, Tampa, FL., Apr. 22, 2013, Optics Express vol. 21, No. 8, pp. 9636-9642.

(Continued)

*Primary Examiner* — Jade R Chwasz
(74) *Attorney, Agent, or Firm* — Thomas | Horstemeyer, LLP

(57) ABSTRACT

In one embodiment, generating an aberration-compensated image of an object field includes generating a full-field complex hologram of the object field, generating a guide star complex hologram of a guide star selected from the object field, performing mathematical correlation between the guide star complex hologram and the full-field complex hologram, and generating from the correlation an aberration-compensated image of the object field from the correlation.

18 Claims, 12 Drawing Sheets

(56) References Cited

OTHER PUBLICATIONS

Channggeng Liu, Xiao Yu, and Myung K. Kim, Phase aberration correction by correlation in digital holographic adaptive optics, Digital Holography and Microscopy Laboratory, Department of Physics University of South Florida, Tampa, Florida. Applied Optics / vol. 52, No. 12 / Apr. 20, 2013, pp. 2940-2949.

Channggeng Liu, Xiao Yu, and Myung K. Kim, Fourier transform digital holographic adaptive optics imaging system, Digital Holography and Microscopy Laboratory, Department of Physics University of South Florida, Tampa, Florida. Dec. 10, 2012 / vol. 51, No. 35 / Applied Optics, pp. 8449-8454.

Myung K. Kim, Incoherent digital holographic adaptive optics, Department of Physics, University of South Florida, Tampa, Florida. Jan. 1, 2013 / vol. 52, No. 1 / Applied Optics, pp. 117-130.

Myung K. Kim, Adaptive optics by incoherent digital holography, Department of Physics, University of South Florida, Tampa, Florida. Optics Letters / vol. 37, No. 13 / Jul. 1, 2012, pp. 2694-2696.

* cited by examiner

INCOHERENT DIGITAL HOLOGRAPHIC ADAPTIVE OPTICS

CROSS-REFERENCE TO RELATED APPLICATION(S)

This application claims priority to co-pending U.S. Provisional Application Ser. No. 61/639,235, filed Apr. 27, 2012, which is hereby incorporated by reference herein in its entirety.

BACKGROUND

Light from distant stars and galaxies travel through the near perfect vacuum of space for millions of years carrying the information about the distant parts of the universe until the last fraction of a second when it plunges through the earth's atmosphere before reaching our eyes or telescopes on the ground. Turbulence within the atmosphere causes degradation or aberration of images such that increasing the aperture of a telescope does not lead to improvement of resolution. Placing the telescope in space above the atmosphere or on top of mountains alleviates the problem but at considerable cost and constraint. Adaptive optics (AO) have been used over the past several decades to compensate for such aberration. When AO are used, the wavefront is sensed and adjusted by the optical system in real time to compensate for any distortion. Remarkable astronomical images have been obtained using ground-based telescopes with AO compensation of atmospheric turbulence, whose quality can even surpass space-based telescopes under favorable conditions. The principle of adaptive optics has also been applied to other imaging systems, most notably in ophthalmic imaging as well as in laser beam forming and remote sensing.

In a typical AO system, a guide star of sufficient brightness is used for measuring the aberration. A common method of wavefront sensing involves the use of a Shack-Hartmann sensor consisting of a lenslet array and a CCD camera underneath it. Distortions of the wavefront lead to shifting of lenslet focal spots proportional to the local slope of the wavefront. This shifting is used to compute the necessary displacement of a deformable mirror or other spatial light modulator. The wave-front sensing, wave-front modulation, and control subsystems form a closed loop to achieve a configuration that minimizes the aberration in the image of the full field.

While AO systems can greatly reduce distortion, they are not without their drawbacks. For example, AO systems are typically complex, high-precision systems that are both expensive and cumbersome. In addition, AO systems are also often slow to operate and prone to faults. It can therefore be appreciated that it would be desirable to have an alternative way to compensate for aberration.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
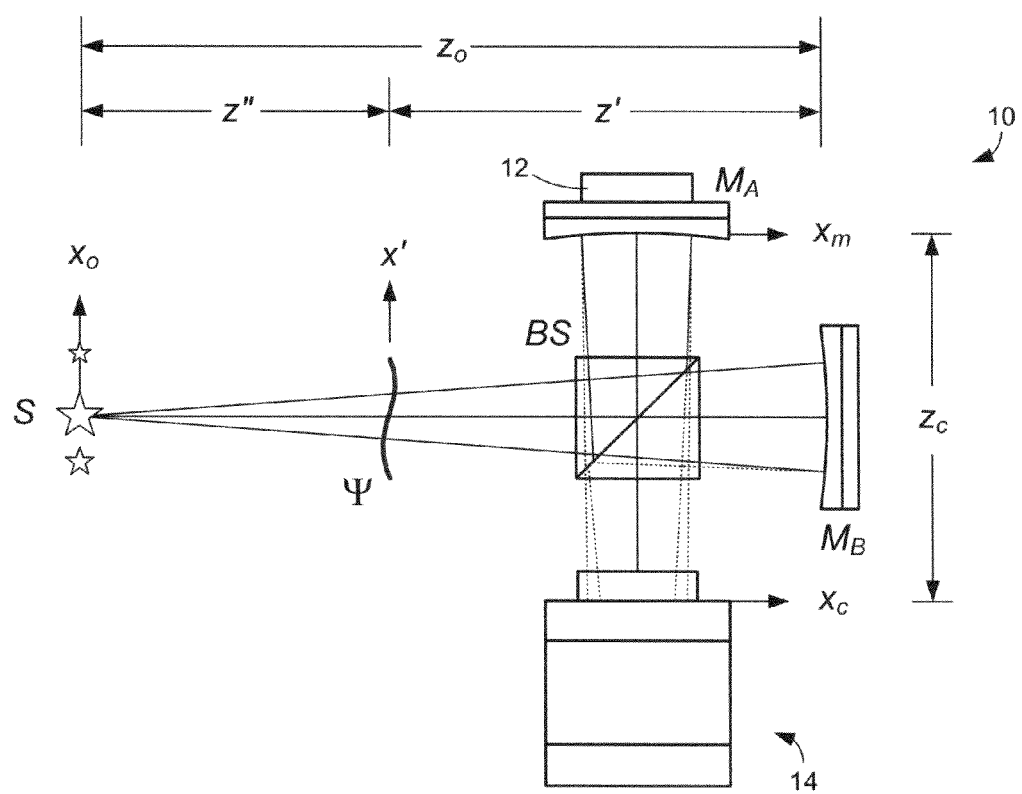
FIG. 1 is a schematic diagram of a first embodiment of a system for performing incoherent digital holographic adaptive optics (IDHAO).

As described above, it would be desirable to have a way to compensate for aberration other than through the use of conventional adaptive optics that rely on a deformable mirror or other spatial light modulator (SLM). Disclosed herein are systems and methods for generating aberration-compensated images using incoherent digital holography. In some embodiments, complex holograms are obtained for the full object field and for a guide star within the object field by combining raw interferograms of the full field and the guide star, respectively. In some embodiments, the interferograms are obtained by performing a phase-shifting procedure using an interferometer having a linearly-displaceable planar mirror and a stationary curved mirror. Once the complex holograms are obtained for the full field and the guide star, mathematical correlation can be performed between the holograms to obtain an aberration-compensated image having reduced distortion.

In the following disclosure, various specific embodiments are described. It is to be understood that those embodiments are example implementations of the disclosed inventions and that alternative embodiments are possible. All such embodiments are intended to fall within the scope of this disclosure.

Described in the present disclosure is a new method of adaptive optics (AO) that can be used to measure and compensate aberrations based on incoherent digital holography with an interferometer. As described below, a hologram of a guide star contains sufficient information to compensate the effect of aberration on the full-field hologram. Although reconstruction from uncompensated full-field holograms yield distorted images comparable to direct nonholographic images formed through the same aberrating medium, the compensated holographic images have much of the aberrations removed. Provided in the disclosure that follows are descriptions of the theoretical, simulation, and experimental studies of the method, which is referred to herein as incoherent digital holographic adaptive optics (IDHAO). As will be apparent from this disclosure, the IDHAO process is robust and efficient under various ranges of parameters such as aberration types and strength. Furthermore, low image signals buried under noise can be extracted by IDHAO to yield high-quality images with good contrast and resolution, both for point-like sources and continuous extended objects illuminated with common incoherent light sources.

A theoretical description of IDHAO can be developed by considering the propagation of spherical waves from object source points through an interferometer, followed by integration of the interference intensities over the source points. A complex hologram is obtained by invoking a phase-shifting procedure, leading to an expression of the holographic image as a convolution of object intensity with a complex point spread function (PSF). Even in the presence an of an aberrating layer, under a specific condition, one obtains an holographic image as a convolution but with distorted PSF. A straightforward procedure is described below to compensate for the aberration by combining holograms of the full-field and a guide star.

FIG. 1 illustrates an example system 10 for performing IDHAO, which can also be used to simply perform incoherent digital holography (IDH). The system 10 is based on a variation of an interferometer in which the pixel-sharing SLM is replaced with a modified Michelson interferometer. As shown in FIG. 1, the system 10 includes a beam splitter BS that produces copies of a spherical wave emanating from each point source of an object field. In this example, the object field is a group of stars S that are imaged with a telescope (not shown). The copies of the spherical wave are provided to two mirrors, $M_A$ and $M_B$, which are both equidistant from the beam splitter BS. Both $M_A$ and $M_B$ are curved (concave) mirrors and therefore apply curvatures to the incident spherical waves. However, the curvatures of the two mirrors $M_A$ and $M_B$ are different from each other. In some embodiments, the mirror $M_A$ has a focal length of approximately 1000 mm to infinity, while the mirror $M_B$ has a radius of curvature of approximately 1000 to 1200 mm and, therefore, a focal length of approximately 500 to 600 mm. The position of the mirror $M_A$ can be adjusted along the optical axis using a linear actuator 12, such as a piezoelectric actuator, to which the mirror is mounted. The mirrors $M_A$ and $M_B$ reflect the incident waves to a camera 14 of the system 10. In some embodiments, the camera 14 comprises a charge-coupled device (CCD).

Two copies of the same optical field are always coherent with each other. Therefore, when the reflected waves are superposed at the camera plane they produce a Fresnel zone-like interference pattern. Specifically, consider a point source of strength $I_o=|E_o|^2$ on the $\Sigma_o(x_o, y_o)$ plane a distance $z_o$ from the curved mirrors. First, consider IDH imaging without the aberrator $\Psi$ in place. The field reflecting from $M_A$ and arriving at the camera plane $\Sigma_c(x_c, y_c)$ a distance $z_c$ from the mirror is, under Fresnel or paraxial approximation, $$E_A(x_c) = \int dx_m E_o Q_{z_o}(x_m - x_o) Q_{-f_A}(x_m) Q_{z_c}(x_c - x_m)$$

$$E_o Q_{z_o - f_A}(x_o) Q_{z_A + z_c}(x_c - x_A) \qquad [\text{Equation 1}]$$

where Q represents the quadratic phase function $$Q_z(x) \equiv \exp\left[\frac{ik}{2z} x^2\right] \qquad [\text{Equation 2}]$$

and $(x_A, y_A; z_A)$ is the image position of the source point through the curved mirror:

$$x_A = -\frac{f_A}{z_o - f_A} x_o; z_A = -\frac{f_A}{z_o - f_A} z_o \qquad [\text{Equation 3}]$$

For compactness of expressions, the overall propagation factors of the form exp(ikz) as well as the constant factors are ignored. In addition, and all (x, y) terms are abbreviated with (x) only. The wavelength is $\lambda = 2\pi/k$. In these calculations, it is useful to note a basic property $$Q_{z_1}(x - x_1) Q_{z_2}(x - x_2) = Q_{z_1 + z_2}(x_1 - x_2) Q_{z_{12}}(x - x_{12}) \qquad [\text{Equation 4}]$$

with $$z_{12} = \frac{z_1 z_2}{z_1 + z_2}; x_{12} = \frac{z_2 x_1 + z_1 x_2}{z_1 + z_2} \qquad [\text{Equation 5}]$$

The other mirror $M_B$ with focal length $f_B$ generates another output field $E_B(x_c)$ with similar definitions of $x_B$ and $z_B$. The two components superpose and interfere to produce the Fresnel zone-like intensity pattern recorded by the camera. One of the cross-terms is $$G_0(x_c; x_o) = E_A E_B^* = I_o(x_o) Q_{z_{AB}}(x_c - \alpha x_o) \quad \text{[Equation 6]}$$

so that the intensity at the camera is $$g(x_c; x_o) = |E_A + E_B|^2 = 2I_o(x_o)\left[1 + \cos\frac{k(x_c - \alpha x_o)^2}{2z_{AB}}\right] \quad \text{[Equation 7]}$$

where $$\alpha = -\frac{z_c}{z_o} \quad \text{[Equation 8]}$$

$$z_{AB} = -\frac{(z_A + z_c)(z_B + z_c)}{z_A - z_B}$$

The point-source interference intensity $g(x_c; x_o)$ has the familiar concentric ring pattern of radially-increasing frequency.

For an extended object illuminated by incoherent light, the source points are incoherent with each other. Therefore, the total intensity is the sum or integral of the point-source interference intensities $g(x_c; x_o)$ contributed by all the source points, $$h(x_c) = \int dx_o g(x_c; x_o) \quad \text{[Equation 9]}$$

which, as soon as a significant number of source points add up, quickly washes out the fringe structures. On the other hand, the phase-shifting process can be applied to extract the integral of the complex cross-term. As noted above, the mirror $M_A$ is piezo-mounted so that a global phase $\phi$ can be applied. Then the interference intensity is $$h_\phi(x_c) = \int dx_o g_\phi(x_c; x_o) = \int dx_o |E_A e^{i\phi} + E_B|^2 \quad \text{[Equation 10]}$$

and a four-step phase-shift process yields $$H_0(x_c) = (1/4)\{[h_0 - h_\pi] - i[h_{\pi/2} - h_{3\pi/2}]\} \quad \text{[Equation 11]}$$

$$= \int dx_o G_0(x_c; x_o)$$

$$= \int dx_o I_o(x_o) Q_{z_{AB}}(x_c - \alpha x_o)$$

$$= I_o' \odot Q_{z_{AB}}(x_c)$$

where $$I_o'(x_c) = I_o\left(\frac{x_c}{\alpha}\right) \quad \text{[Equation 12]}$$

is the scaled object intensity pattern and the symbol $\odot$ represents the convolution. The subscript 0 in $G_0$ and $H_0$ signifies the absence of aberration. That is, one obtains a complex hologram as a convolution of the object intensity $I_o'$ with a complex point spread function (PSF) $Q_{z_{AB}}$. For holographic reconstruction, the complex hologram $H_0(x_c)$ can be back propagated by the distance $-z_{AB}$ $$I_o'(x_c) = H_0 \odot Q_{-z_{AB}}(x_c) \quad \text{[Equation 13]}$$

Now consider IDH imaging in the presence of the phase aberrator $\Psi(x')$ at the $\Sigma'(x', y')$ plane. The field component A arriving at the output plane $\Sigma_c(x_c, y_c)$ is now $$E_A(x_c) = \int dx' \int dx_m E_o Q_{z^*}(x' - x_o) \Psi(x') Q_{z'}(x_m - x')$$
$$Q_{-fA}(x_m) Q_{z_c}(x_c - x_m)$$
$$= E_o Q_{z_o - fA}(x_o) Q_{z_A + z_c}(x_c - x_A) \Phi_A(x_c - \alpha_A x_o) \quad \text{[Equation 14]}$$

where $$\Phi_A(x) = [\psi \odot Q_{\zeta_A}](\beta_A x) = \int dx' \Psi(x') Q_{\zeta_A}(x' - \beta_A x) \quad \text{[Equation 15]}$$

and $$\alpha_A = -\frac{z'}{z''} \frac{z_A + z_c}{z_A} + \alpha \quad \text{[Equation 16]}$$

$$\beta_A = \frac{z''}{z'' + z'} \frac{z_A}{z_A + z_c}$$

$$\zeta_A = \frac{z''}{z'' + z'}\left[z' + \frac{z''}{z'' + z'} \frac{z_A z_c}{z_A + z_c}\right]$$

Combining with a similar expression for $E_B$, one can obtain the complex hologram of a single source point $$\text{[Equation 17]}$$
$$G_\Psi(x_c; x_o) = E_A E_B^*$$
$$= I_o(x_o) Q_{z_o - fA}(x_o) Q_{z_o - fB}^*(x_o) Q_{z_A + z_c}(x_c - x_A)$$
$$Q_{z_B + z_c}^*(x_c - x_B) \Phi_A(x_c - \alpha_A x_o) \Phi_B^*(x_c - \alpha_B x_o)$$
$$= I_o(x_o) Q_{z_{AB}}(x_c - \alpha x_o) \Phi_A(x_c - \alpha_A x_o) \Phi_B^*(x_c - \alpha_B x_o)$$

and for an extended object $$\text{[Equation 18]}$$
$$H_\Psi(x_c) = \int dx_o G_\Psi(x_c; x_o)$$
$$= \int dx_o I_o(x_o) Q_{z_{AB}}(x_c - \alpha x_o) \Phi_A(x_c - \alpha_A x_o) \Phi_B^*(x_c - \alpha_B x_o)$$

The last integral is turned into a convolution if $z'=0$, as described below, so that $\alpha_A = \alpha_B = \alpha$. Then $$G_\Psi(x_c; x_o) = I_o(x_o)[Q_{z_{AB}} \Phi_A \Phi_B^*](x_c - \alpha x_o) \quad \text{[Equation 19]}$$

and $$H_\Psi(x_c) = I_o' \odot [Q_{z_{AB}} \Phi_A \Phi_B^*](x_c) \quad \text{[Equation 20]}$$

Aberration compensation for adaptive optics proceeds as follows. A hologram of a guide star of unit magnitude at the center of the field is acquired to yield $$G_\psi(x_c) \equiv G_\Psi(x_c; 0) = [Q_{z_{AB}} \Phi_A \Phi_B^*](x_c) \quad \text{[Equation 21]}$$

The full-field complex hologram $H_\Psi(x_c)$ is then $$H_\psi(x_c) = I_o' \odot G_\psi(x_c) \quad \text{[Equation 22]}$$

An attempt to reconstruct by numerical propagation $Q_{-z_{AB}} = G_o^*$ corresponds to $$\hat{I}_\psi = H_\psi \odot G_0^* = H_\psi \otimes G_0 = I_o' \odot [G_\psi \otimes G_0] \quad \text{[Equation 23]}$$

which in general does not yield accurate reproduction of the object $I_o'$. The symbol $\otimes$ stands for correlation. On the other hand, use of the guide star hologram leads to $$\hat{I}_\psi = H_\psi \otimes G_\psi = I_o' \odot [G_\psi \otimes G_\psi] \approx I_o' \odot \delta = I_o' \quad \text{[Equation 24]}$$

That is, as long as the auto-correlation of the guide star hologram is sharp enough, the result is an accurate reproduction of the object $I_o'$. In the absence of the aberration the delta function is exact, $G_0 \otimes G_0 = \delta$. Equivalently, the hologram aberration can be compensated by subtracting the phase error of $G_\Psi$ from $H_\Psi$ in the Fourier domain. That is, $$\hat{I}_\Psi = H_\Psi \odot G_0^* \qquad \text{[Equation 25]}$$

where $$\hat{H}_\Psi = H_\Psi \otimes (G_\Psi \otimes G_0) \qquad \text{[Equation 26]}$$

The latter method involves an additional correlation operation, but has the flexibility of being able to re-center the guide star hologram $G_0$ to avoid lateral shift of the final full-field reconstructed image. For comparison, one can also calculate the direct image formed when one of the mirror $M_B$ focuses the image on the camera plane while the other mirror is blocked so that $$I_B(x_c) = \int dx_o |E_B(x_c; x_o)|^2 = \int dx_o I_o(x_o) |\Phi(x_c - \alpha x_o)|^2 \qquad \text{[Equation 27]}$$

When focused, $z_B + z_c = 0$ so that $\beta_B \rightarrow \infty$ and $\zeta_B \rightarrow \infty$. However, closer examination of the exponent in $Q_{\zeta_B}(x' - \beta_B x)$ shows that $$|\Phi'_B(x_c)|^2 = |\tilde{\psi}(x_c)|^2 \qquad \text{[Equation 28]}$$

where $\tilde{\psi}$ is the Fourier transform of $\Psi$ $$\tilde{\psi}(x_c) = \int dx' \psi(x') \exp\left[-ik \frac{x_c}{z_c} x'\right] \qquad \text{[Equation 29]}$$

so that $$I_B(x_c) = [I_o' \odot |\tilde{\psi}|^2](xc) \qquad \text{[Equation 30]}$$

As expected, the PSF is the absolute square of the Fourier transform of the aperture.

Figure 2:
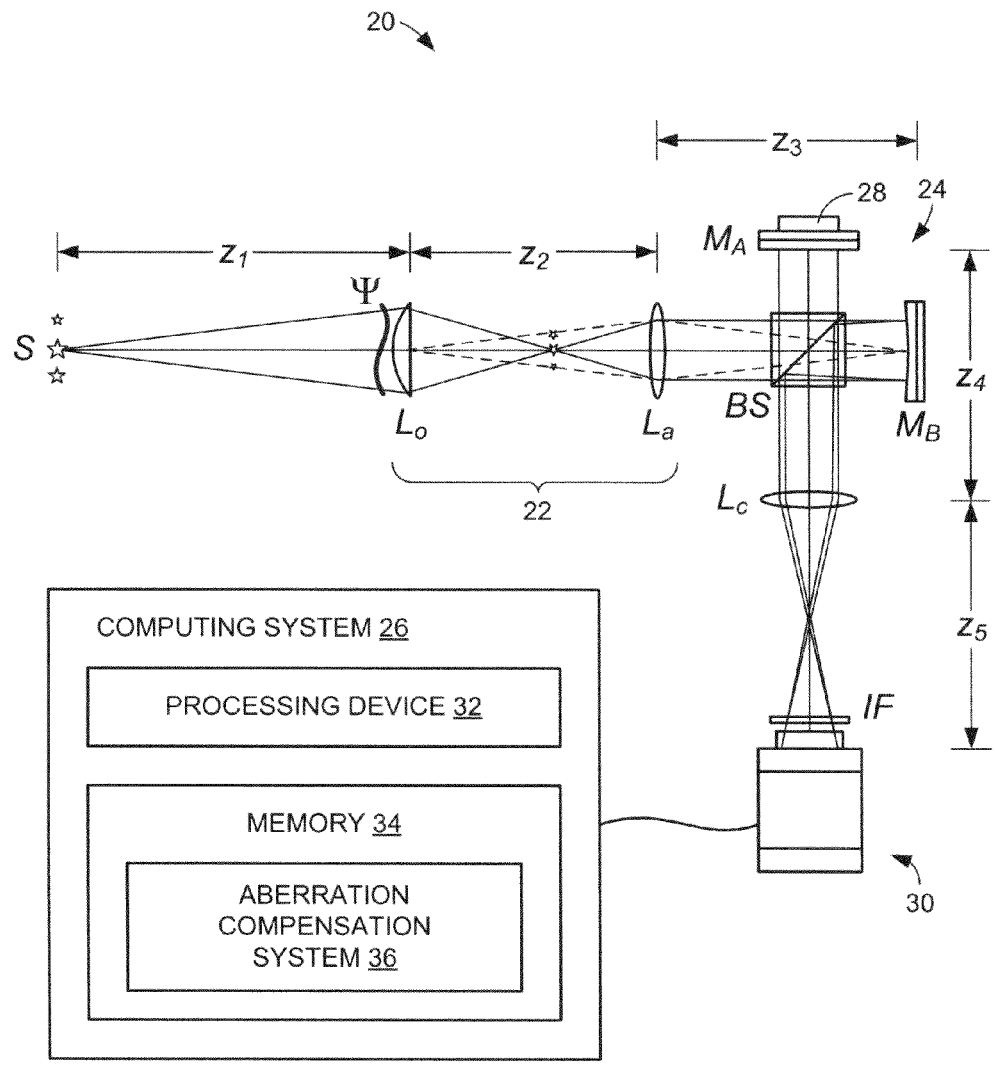
FIG. 2 is a schematic diagram of a second embodiment of a system for performing IDHAO.

A series of simulation studies were conducted to characterize the predictions of the above-described theory. IDHAO was experimentally implemented using the configuration depicted in FIG. 2, and the simulations assume a similar configuration. As shown in FIG. 2, a system 20 for performing aberration compensation using incoherent digital holography, i.e., an IDHAO system, generally comprises an optical system 22, an interferometer 24, and a computing system 26. In the illustrated example, the optical system 22 is a telescope that is used to image an object field that includes a group of stars S. The optical system 22 is represented by an objective lens $L_o$ and a relay lens $L_a$ that together form an intermediate image in front of the interferometer 24. As is shown in FIG. 2, a phase aberrator $\Psi$ is placed close to the objective lens $L_o$ on the side that faces the stars S. The aberrator $\Psi$ represents, for example, the atmospheric turbulence in astronomical applications or inhomogeneities of a medium in microscopy applications.

The interferometer 24 includes a beam splitter BS and two mirrors $M_A$ and $M_B$. Mirror $M_A$ is a planar mirror while $M_B$ is a curved (concave) mirror. In some embodiments, the mirror $M_B$ has a radius of curvature of approximately 1000 to 1200 mm and, therefore, a focal length $f_B$ of approximately 500 to 600 mm. The mirror $M_A$ is mounted to a linear actuator 28, such as a piezoelectric actuator, that can adjust the position of the mirror along the optical axis for phase shifting. In some embodiments, the actuator 28 is capable of nanometer-scale adjustment of the mirror $M_A$. The interferometer 24 further includes an imaging lens $L_c$ that focuses the waves reflected by the mirrors $M_A$ and $M_B$ onto a camera 30, which can comprise a CCD or other light detector. As is further shown in FIG. 2, the interferometer 24 can also comprise an interference filter IF positioned near the camera 30 that helps improve the interference contrast.

During use of the system 20, the objective lens $L_o$ of focal length $f_o$ forms an intermediate image in front of the interferometer 24. The relay lens $L_a$ is used to image the input pupil onto the mirrors $M_A$ and $M_B$, achieving the requirement of z'=0. The imaging lens $L_c$ is used, in combination with $L_o$, to adjust the magnification and resolution of the system 20.

With further reference to FIG. 2, the computing system 26 generally comprises a processing device 32 and memory 34 (i.e., a computer-readable medium) that stores an aberration compensation system 36 that includes one or more algorithms (i.e., logic). As is described below, image data, such as interference patterns, captured by the camera 30 can be provided to the computing system 26 for processing including the generation of aberration-compensated images of the object field.

Figure 3:
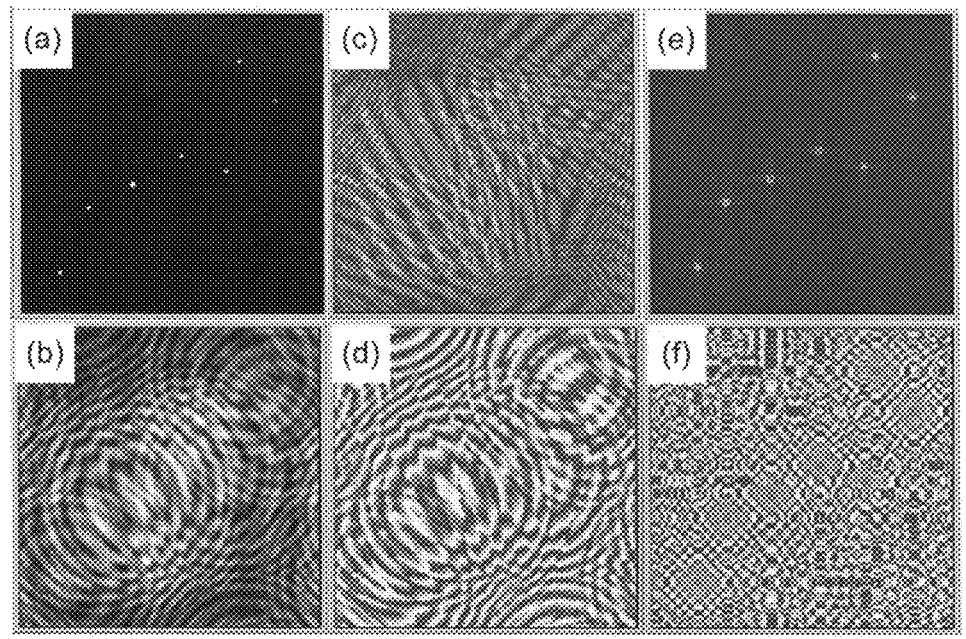
FIG. 3 illustrates a simulation of incoherent digital holography (IDH) and includes images of (a) an object field, (b) a raw inteferogram of the object field, (c) the amplitude of a complex hologram of the object field, (d) the phase of the complex hologram, (e) the amplitude of a reconstructed image, and (f) the phase of the reconstructed image.

The system 20 can be used to perform basic IDH. An example IDH process will now be described in relation to FIG. 3. In this example, the object field $I_o$ is the Big Dipper, as shown in FIG. 3(a), and it is assumed that there is no aberration for which to compensate. Each image frame in this example includes 256 pixels and is 10 mm across. The assumed optical configuration is such that the light from each point source of the object field arrives on the mirrors $M_A$ and $M_B$ as a plane wave. The mirror $M_B$ is assumed to have a focal length $f_B$ of 3000 mm, the imaging lens $L_c$ is absent, and the camera is positioned at $z_c = z_4 + z_5 = 1000$ mm from the mirrors so that the holographic image distance is $z_i = 2000$ mm. The wavelength is set to $\lambda = 633$ nm.

Light waves from the object field are received by the interferometer 28 from the optical system 22. The light waves are divided by the beam splitter BS and copies are provided to each mirror MA and MB. The mirrors MA and MB reflect the light waves so that they are received by the camera 30. Because the mirrors MA and MB have slightly different curvatures, the waves that arrive at the camera 30 have different curvatures. The waves interfere with each other and, because of their differences in curvature, form a ring pattern. An example of such a ring pattern is shown in FIG. 3(b), which is an example raw interferogram hφ. One ring pattern is formed for each point source of the object field, in this case each star of the Big Dipper (seven in total).

Multiple raw interferograms can be obtained with the mirror $M_A$ in different positions to obtain multiple phase-shifted interferograms. For example, a first interferogram can be obtained when the mirror $M_A$ is in a first position. The mirror $M_A$ can then be moved approximately 1 to 650 nm along the optical path to a second position using the actuator 28 and a second interferogram can be obtained. This process can be repeated as many times as desired to obtain as many interferograms as desired. Although only two phase-shifted interferograms are necessary, many more can be obtained to improve results. In this example, it is assumed that four raw interferograms are obtained.

Once the raw interferograms have been obtained they can be combined by the computer system 26 to form a complex hologram $H_0$ of the object field. FIGS. 3(c) and 3(d) respectively shown the amplitude and phase profiles of an example complex hologram. It is noted that, in most of the illustrations in this disclosure, complex images, such as complex holograms, are shown as a pair of amplitude and phase images. The amplitude images were rendered with the Matlab definition of "jet" color map, while for the phase images the blue-white-red color map corresponds to the range $[-\pi, \pi]$. Once the complex hologram has been obtained, numerical propagation to an appropriate distance, such as the distance to the intermediate image formed between the objective lens $L_o$ and the relay lens $L_a$, can be performed to obtain a reconstructed image. FIGS. 3(e) and 3(f) show the amplitude and phase profiles of the reconstructed image, respectively.

Figure 4:
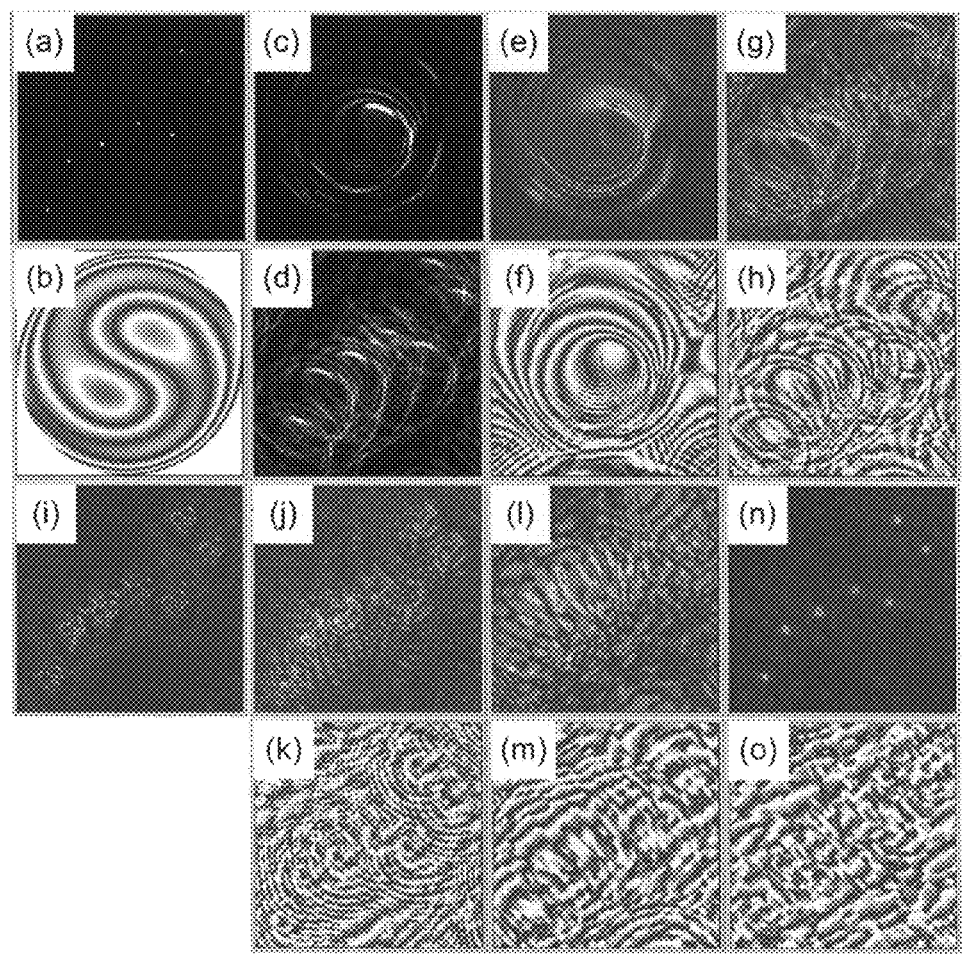
FIG. 4 illustrates a simulation of adaptive optics using IDH and includes images of (a) an object field, (b) an assumed phase aberration, (c) a guide star inteferogram, (d) a full-field interferogram, (e) the amplitude of a complex hologram of the guide star, (f) the phase of the complex hologram of the guide star, (g) the amplitude of a complex hologram of the object field, (h) the phase of the complex hologram of the object field, (i) a direct image without the holographic process, (j) the amplitude of an IDH image without aberration compensation, (k) the phase of the IDH image without aberration compensation, (l) the amplitude of the complex hologram for the object field with aberration compensation, (m) the phase of the complex hologram for the object field with aberration compensation, (n) the amplitude of the IDH image with aberration compensation, (o) the phase of the IDH image with aberration compensation.

In cases in which aberration is present, the system 20 can be used in an IDHAO context to compensate for the aberration. Such compensation can be, for example, performed by the aberration compensation system 36 of the computing system 26. An example IDHAO process is described in relation to in FIG. 4. In this example, the Big Dipper is again used as the input image $I_o$, as shown in FIG. 4(a). The assumed phase aberration profile $\Psi$ is shown in FIG. 4(b) and consists of two Zernike polynomial terms, $\psi = a_\psi(Z_3^{+1} + Z_5^{-1})$ with $a_\psi = -0.5$. As before, multiple phase-shifted interferograms can be obtained for the object field. In addition, multiple phase-shifted interferograms can also be obtained for a guide star, i.e., a single point source (a single star in this example) that can be used as a reference for compensation purposes. This can be achieved by obstructing much of the light from the object field using an aperture so that only light from the guide star is received by the interferometer 24. FIG. 4(c) shows an example raw interferogram $g_\phi$ for the guide star and FIG. 4(d) shows an example raw interferogram $h_\phi$ for the full-field illumination (i.e., all of the stars).

As described above, multiple phase-shifted inteferograms can be obtained, both for the guide star and the full field. The inteferograms can then be combined to form a complex hologram $G_\Psi$ for the guide star and a complex hologram $H_\Psi$ for the full field. FIGS. 4(e) and 4(f) show the amplitude and phase profiles of a guide star complex hologram that results from a set of four quadrature phase-shifted interferograms, and FIGS. 4(g) and 4(h) show the amplitude and phase profiles of a full-field complex hologram that results from a set of four quadrature phase-shifted interferograms.

FIG. 4(i) shows an expected direct image $I_B$ through the aberrator without any holographic process, while FIGS. 4(j) and (k) show the reconstruction $I_\Psi$ from the hologram $H_\Psi$. As can be appreciated from these figures, both $I_B$ and $I_\Psi$ have serious degradation because of the aberration. Therefore, aberration compensation is needed. FIGS. 4(l) and 4(m) show the amplitude and phase of the compensated hologram $\hat{I}_\psi$. Note that the vortex-like structures in FIG. 4(h) have been replaced by more concentric ones in FIG. 4(m). FIGS. 4(n) and (o) show the amplitude and phase profiles of an aberration-compensated image $I_\psi$. The aberration-compensated image can be obtained by numerical propagation from the compensated hologram $\hat{I}_\psi$ or by correlation of the guide star complex hologram $G_\Psi$ (FIGS. 4(e) and 4(f)) and the full-field complex hologram $H_\Psi$ (FIGS. 4(g) and 4(h)). In the correlation process, whenever a pattern within the complex hologram $G_\Psi$ matches a pattern in the complex hologram $H_\Psi$, a large peak results that coincides with the location of a point source of the object field. The stronger the correlation, the larger the peak and the greater the certainty of the location of the point source. Notably, this occurs irrespective of which point source is selected as the guide star as long as the mirrors $M_A$ and $M_B$ are the same distance from the relay mirror $L_a$. That distance corresponds to the image plane of the objective lens $L_o$.

As is apparent from FIG. 4(n), the compensated image $\hat{I}_\psi$ has much less distortion than the direct image $I_B$ or the uncompensated holographic image $I_\Psi$, and therefore provides a well-focused image of the point sources of $I_o$.

Figure 5A:
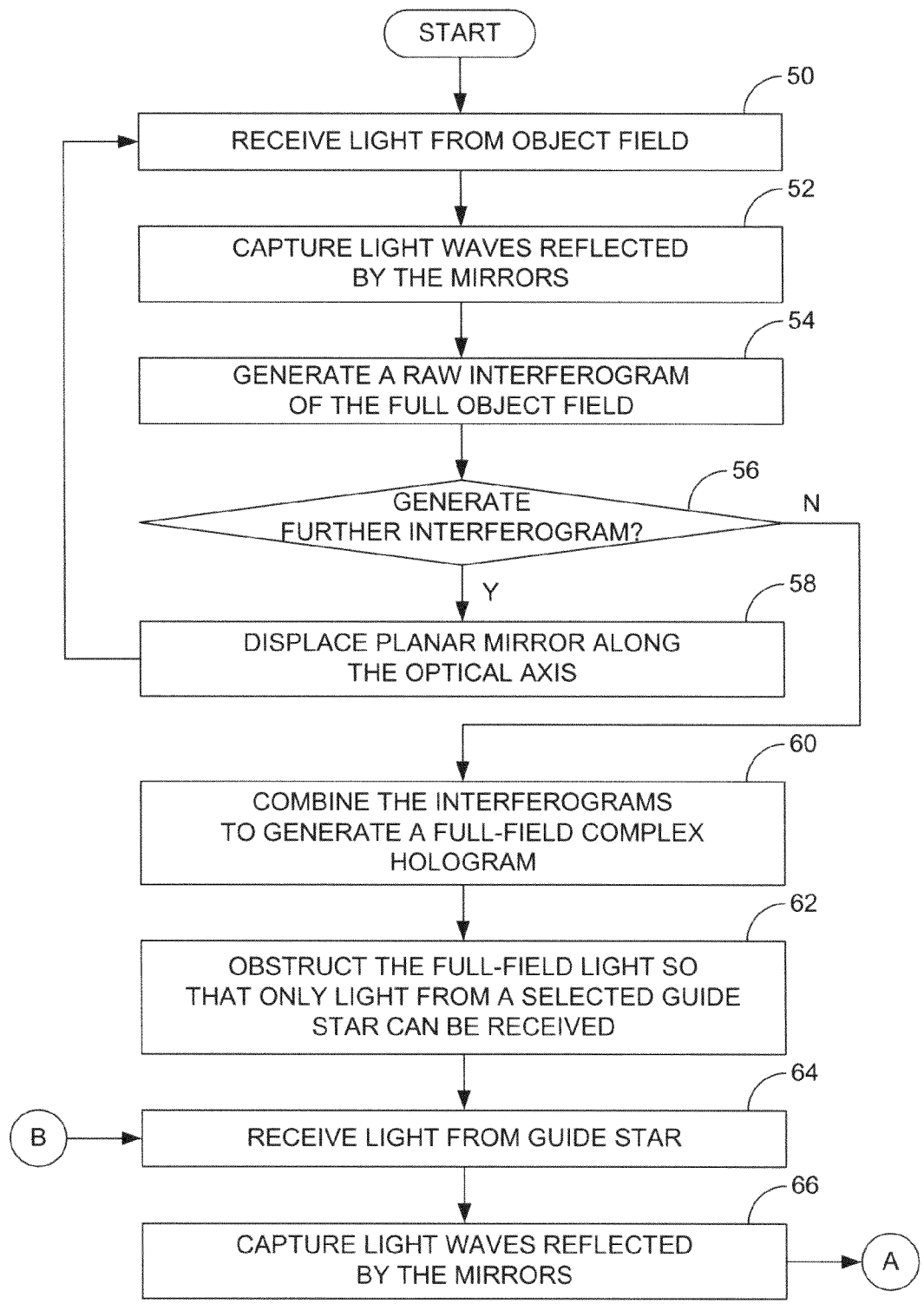
FIGS. 5(a) and (b) together are a flow diagram of a method for generating aberration-compensated images using IDH.
Figure 5B:
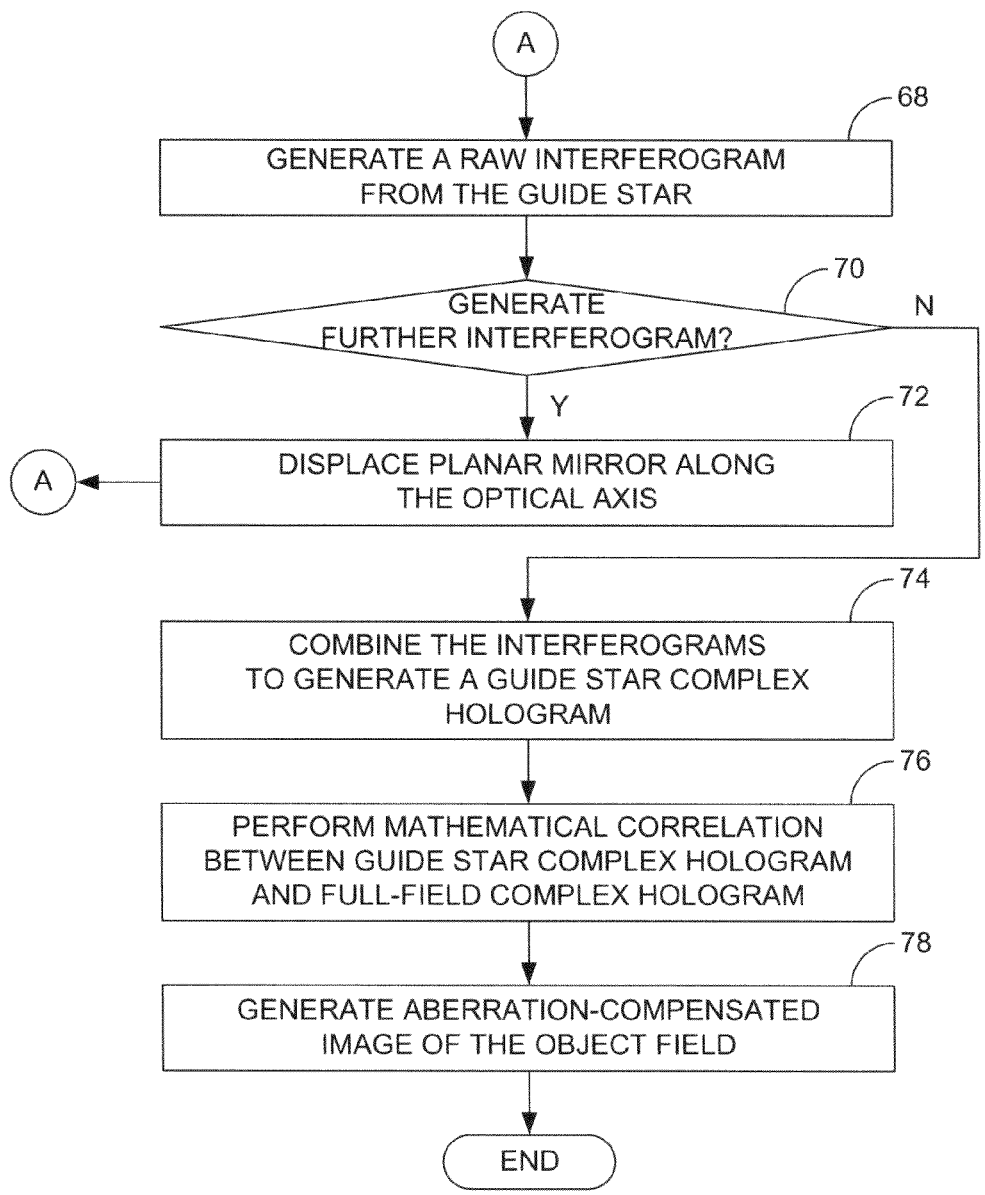

FIGS. 5(a) and 5(b) describe an example method for compensating for aberration using incoherent digital holography that is consistent with the discussions of FIGS. 3 and 4 above. Beginning with block 50 of FIG. 5(a), light from an object field is received by an interferometer from an optical system, such as a telescope. While a telescope has been explicitly identified, it is noted that the optical system could take other forms. For example, the optical system could be that of a microscope or other imaging device. Turning to block 52, the light waves that are reflected by the mirrors of the interferometer are captured. As described above, the waves can be reflected by a planar mirror $M_A$ and a curved mirror $M_B$ and can be captured by a camera, such as a CCD. In addition, the light waves received from the optical system can have been split by a beam splitter of the interferometer to provide copies of the waves to both mirrors. As described above, the waves reflected by the mirrors interfere with each other and form an interference pattern, which can be captured by the camera. A raw interferogram $h_\phi$ of the full object field can therefore be generated, as indicated in block 54, and can be stored by the computing system. An example of a full-field interferogram is shown in FIG. 4(d).

With reference next to decision block 56, flow from this point depends upon whether a further interferogram is to be obtained. If only one interferogram has been obtained to this point, at least one more interferogram will be obtained. If more than one interferogram has already been obtained, however, flow depends upon whether how many interferograms have been obtained and how many are desired to for purposes of generating a full-field complex hologram. Assuming that another interferogram is to be obtained, flow continues to block 58 and the planar mirror $M_A$ is displaced along the optical axis of the system for purposes of phase shifting. As described above, the distance that the mirror is displaced can be very small. By way of example, the mirror can be displaced approximately 1 to 650 nm. Such fine movement can be obtained using a precise actuator, such as a piezoelectric actuator.

Once the mirror $M_A$ has been displaced, flow returns to block 50 and the above-described process is repeated so that a further full-field interferogram is generated. With reference again to decision block 56, if the desired number of interferograms has been obtained, flow continues to block 60 at which the interferograms are combined to generate a full-field complex hologram $H_\Psi$. FIGS. 4(g) and 4(h) illustrate the amplitude and phase profiles of an example full-field complex hologram.

At this point, numerical propagation could be used to form a reconstructed image. If there is aberration present, however, that image would be distorted. Accordingly, aberration compensation should be performed. As described above, such compensation can be achieved by performing correlation between the full-field complex hologram and a complex hologram of a guide star selected from the full object field. In such a case, the full-field light can be obstructed so that only light from a selected guide star can be received, as indicated in block 62. As described above, this can be achieved using an aperture that blocks light from other light sources within the object field. Once the full-field light is obstructed, light can be received from the guide star by the interferometer, as indicated in block 64, and the light waves that are reflected by the mirrors of the interferometer are captured, as indicated in block 66. As above, the wave reflected by the mirrors interfere with each other and form an interference pattern, which can be captured by the camera. A raw interferogram $g_\phi$ of the guide star can therefore be generated, as indicated in block 68 of FIG. 5(b). An example of such a guide star interferogram is shown in FIG. 4(c).

With reference next to decision block 70, flow from this point depends upon whether a further interferogram is to be obtained. In some embodiments, the same number of interferograms that were obtained for the full field is obtained for the guide star. If another interferogram is to be obtained, flow continues to block 72 and the planar mirror $M_A$ is displaced along the optical axis of the system for purposes of phase shifting. Once the mirror $M_A$ has been displaced, flow returns to block 64 of FIG. 5(a) and the above-described process is repeated so that a further guide star interferogram is generated. Once the desired number of interferograms has been obtained, flow continues to block 74 of FIG. 5(b) at which the interferograms are combined to generate a guide star complex hologram $G_\psi$. FIGS. 4(e) and 4(f) illustrate the amplitude and phase profiles of an example guide star complex hologram.

At this point, a complex hologram has been generated for both the full object field and the guide star. To compensate for aberration, mathematical correlation can be performed between the guide star complex hologram and the full-field complex hologram, as indicated in block 76. In the example of FIG. 4, this means that FIGS. 4(e) and (f) are correlated with FIGS. 4(g) and (h). As described above, in the correlation process, whenever a pattern within the complex hologram $G_\psi$ matches a pattern in the complex hologram $H_\psi$, a large peak results that coincides with the location of a point source of the object field. When such correlation is performed, an aberration-compensated image of the object field can be generated, as indicated in block 78. FIG. 4(n) is an example of such an aberration-compensated image.

The behavior of IDHAO was simulated as several different parameters were varied, including the resolution, aberration strength, and aberration type. IDHAO was seen to be effective under wide range of these parameters, as well as under increasing noise added to the phase profile. Aberration compensation is expected to be equally effective for extended continuous objects as well as point-source objects.

Figure 6:
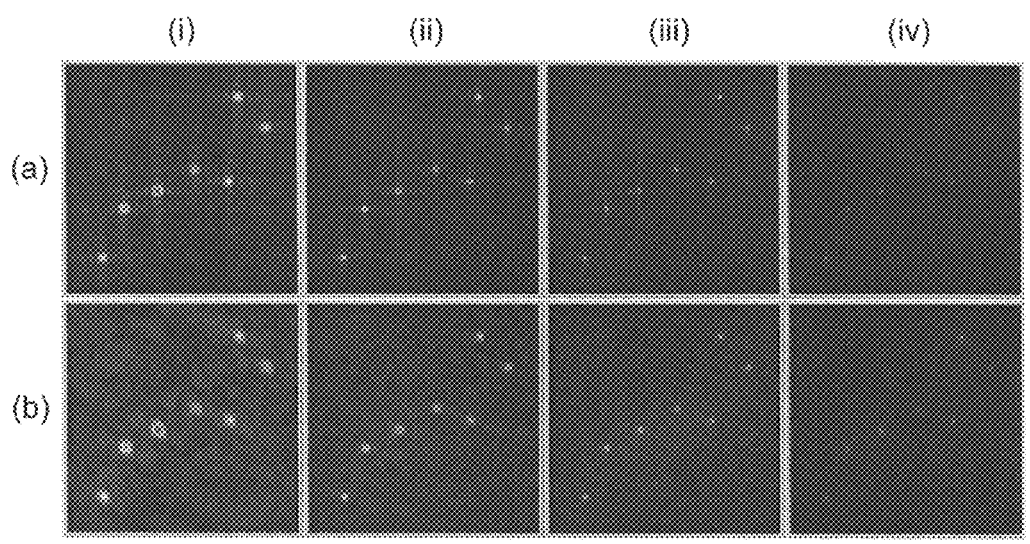
FIG. 6 illustrates the resolution of reconstructed images versus focal length and includes images (a) without aberration and (b) with aberration for focal lengths of (i) 5000, (ii) 3000, (iii) 2000, and (iv) 1000 mm.

As shown in FIG. 6(a), the resolution of the IDHAO-reconstructed images is found to be consistent with the expected behavior of $\delta x \propto \lambda f_B/a$, where a=10 mm is the frame size, the mirror $M_A$ is planar, and the focal length of $M_B$ is varied over a range. In FIG. 6(b), an aberration $\psi = a_\psi (Z_3^{+1} + Z_5^{-1})$ with $a_\psi = -0.5$ is assumed. Evidently, the resolution of reconstructed image is not significantly affected by the aberration when compensated by IDHAO and behaves in an otherwise similar manner as in FIG. 6(a). The image resolution is also expected to depend on the arrangement of the imaging lens $L_c$ and the camera with respect to the overlap of the reflections from the two mirrors $M_A$ and $M_B$, though the imaging lens was not included in the simulation.

Figure 7:
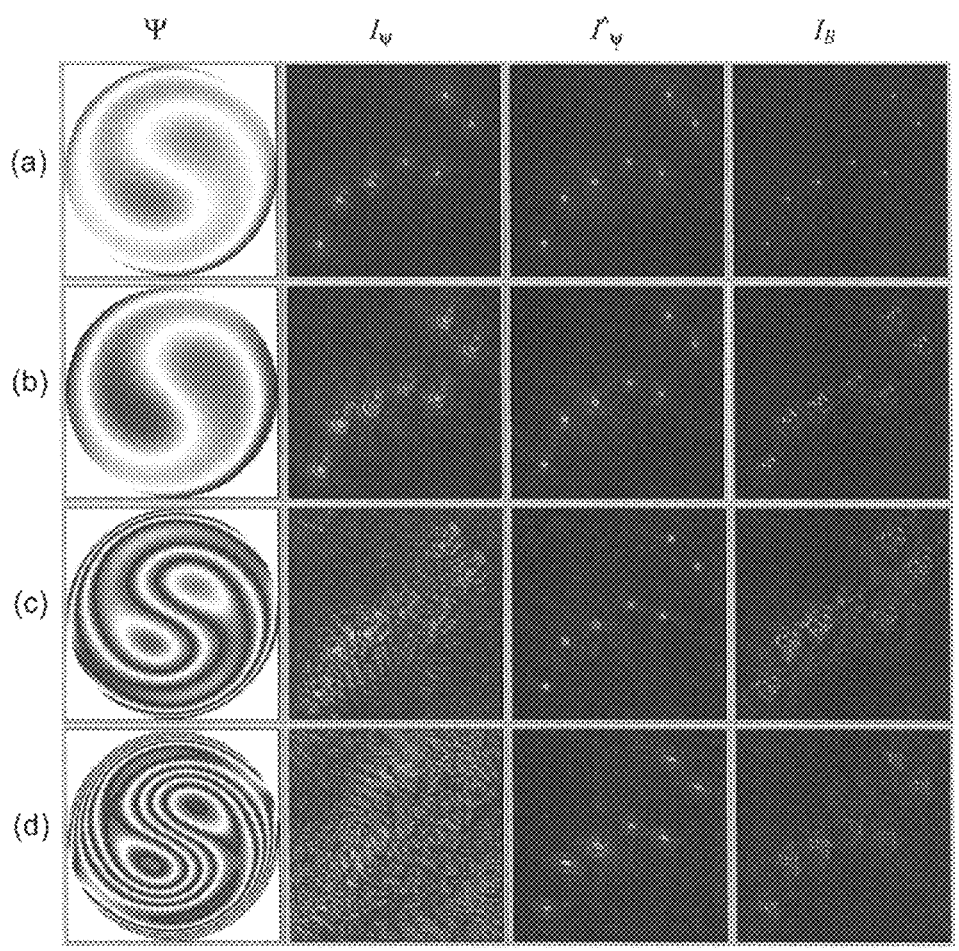
FIG. 7 illustrates IDHAO versus strength of aberration and includes images of. In each row are shown the phase aberration, the uncompensated image, the compensated image, and the direct image. The strength of the aberration is varied as (a) $a_\psi = -0.1$, (b) $a_\psi = -0.2$, (c) $a_\psi = -0.5$, and (d) $a_\psi = -1.0$.

Behavior of the IDHAO with increasing strength of aberration is illustrated in FIG. 7. The aberration was varied for (a) $a_\psi = -0.1$, (b) $a_\psi = -0.2$, (c) $a_\psi = -0.5$, and (d) $a_\psi = -1.0$ of the same type $\psi = a_\psi (Z_3^{+1} + Z_5^{-1})$ as above. Other parameters were as in FIG. 4. The aberration phase profiles are displayed on the left of each row. Then, $I_\psi$ is the uncompensated holographic image and $\hat{I}_\psi$ is the holographic image compensated by IDHAO, while the direct image $I_B$ is also shown for comparison. That is, $I_\psi$ or $I_B$ are the "before" images, while $\hat{I}_\psi$ is the "after" image. It can be seen that the compensated image maintains reasonable quality for even high levels of aberration, whereas both the uncompensated and direct images deteriorate quite rapidly. For the strongest aberration in FIG. 7(d), the aberration completely obliterates the uncompensated image $I_\psi$ and the direct image $I_B$, though the latter develops a numerical artifact that makes the obliteration less obvious. However, the compensated image $\hat{I}_\psi$ still maintains good resolution and contrast. On the other hand, note that while the compensated image $\hat{I}_\psi$ maintains relatively sharp central peaks, the peak height does decrease and a broader halo develops around each peak as the aberration increases.

Figure 8:
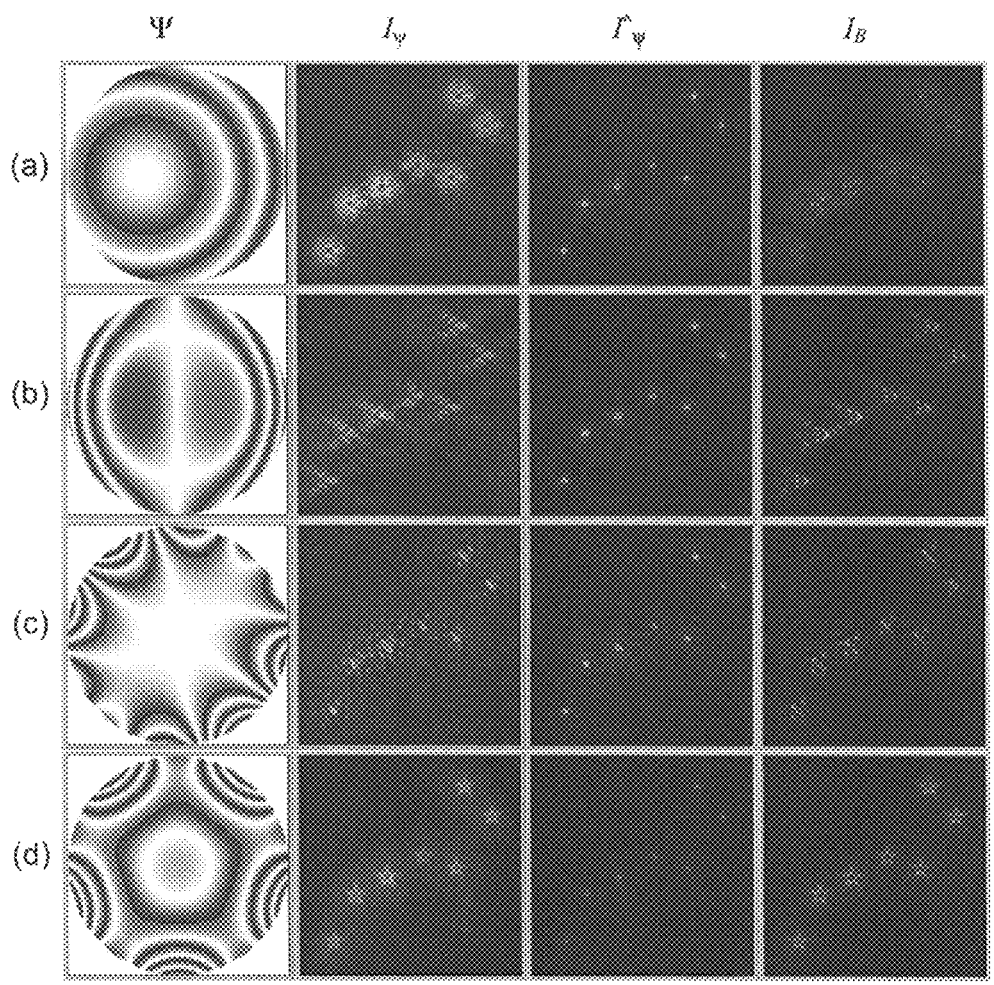
FIG. 8 illustrates IDHAO versus various types of aberration: (a) $\psi=(-0.5) \times Z_1^{+1}+(-0.5) \times Z_2^0$ $\psi=(-0.5) \times Z_1^{+1}+(-0.5) \times Z_2^0$, (b) $\psi=(-0.5) \times Z_1^{+1}+(-0.5) \times Z_3^{+1}$, (c) $\psi=(-0.5) \times Z_3^{+3}+(-0.5) \times Z_5^{-5}$, and (d) $\psi=(-0.7) \times Z_2^0+(-0.5) \times Z_5^{-5}$.

The IDHAO process is equally effective for various types of aberrations, as shown in FIG. 8. In particular, the effectiveness of IDHAO is not contingent upon the symmetry of the aberration profile. Note that the uncompensated images $I_\psi$ and $I_B$ show similar patterns of distortion for each type of aberration, and the compensation removes most of the distortions in $\hat{I}_\psi$.

Figure 9:
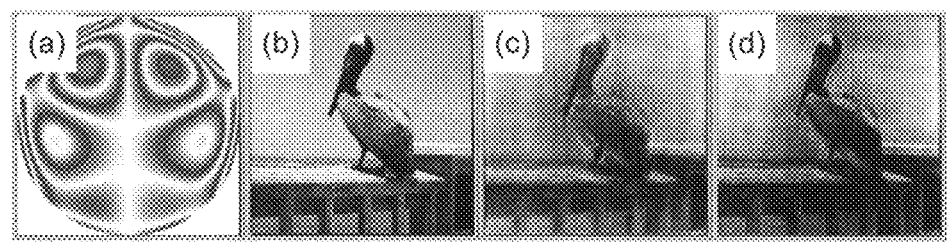
FIG. 9 illustrates IDHAO of an extended gray-scale object and includes images of (a) the assumed phase aberration, (b) the object, (c) the uncompensated image, and (d) the compensated image.

Next, in FIG. 9, a gray-scale photographic image is used as the model object, most other parameters being the same as before. Because of the large number of non-zero object pixels, the computation is substantially longer compared to the preceding simulations, where the object consisted of seven illuminated pixels. The IDHAO process needs to be calculated for each source point before integrating over all pixels. However, the IDHAO process is seen to behave as expected and is able to remove much of the distortion and mostly recover the resolution loss due to the assumed phase aberration.

Figure 10:
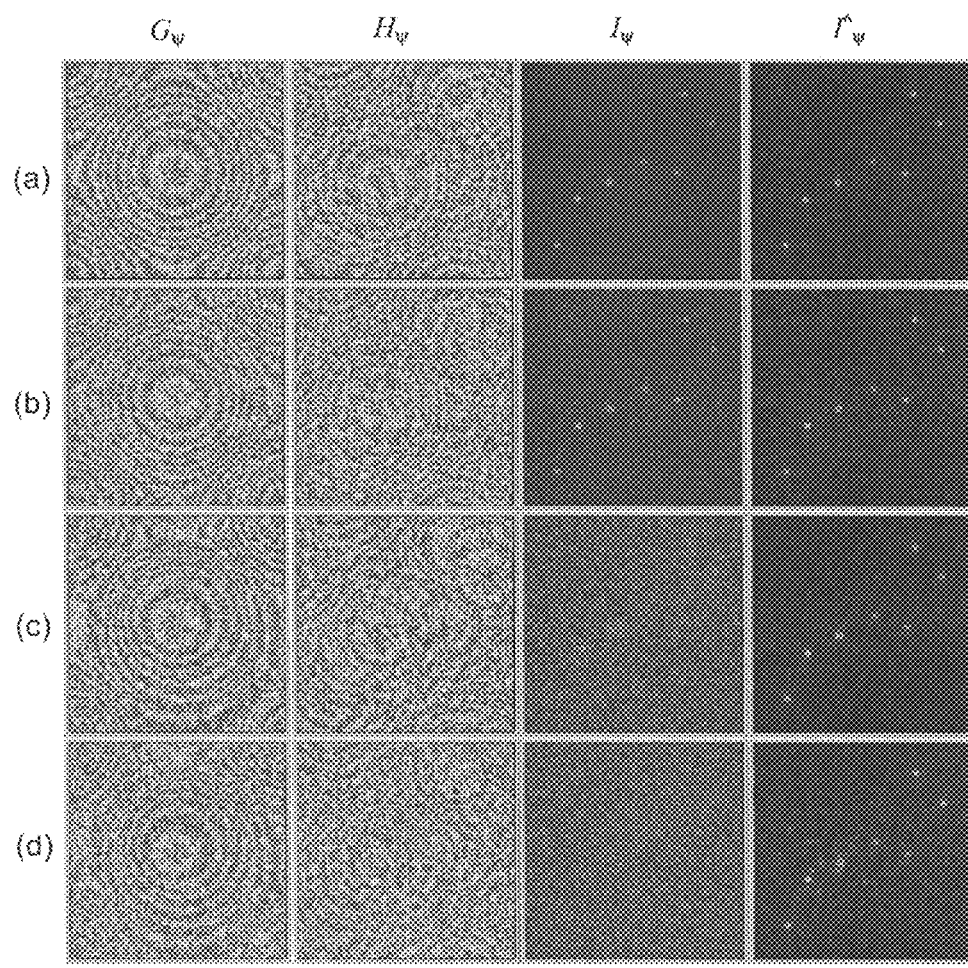
FIG. 10 illustrates the effect of a noisy hologram on IDHAO. In each row the phase of $G_\psi$ and $H_\psi$ and the amplitude of $I_\psi$ and $I_\psi$ are shown for (a) $a_\psi=0, a_\Phi=5$, (b) $a_\psi=0, a_\Phi=10$, (c) $a_\psi=0.2, a_\Phi=5$, and (d) $a_\psi=0.2, a_\Phi=10$.

Lastly, the behavior of IDHAO in the presence of noise was considered. In FIG. 10, the noise was simulated by adding random phase noise on the complex holograms $G_\psi$ and $H_\psi$ to each pixel in the holograms is added a phase of $a_\phi$ times a random number in the range [0,1], with $a_\phi = 5$ for rows (a) and (c) or $a_\phi = 10$ for rows (b) and (d). The first two rows (a) and (b) assume no aberration, $a_\phi = 0$, while the lower two rows (c) and (d) assume $a_\phi = 0.2$, in $\psi = a_\psi (Z_3^{+1} + Z_5^{-1})$. The phase noise in each case is significant enough to almost obscure the underlying Fresnel ring patterns, though not completely. Reconstructed images $I_\psi$ without compensation suffer and, especially when a small amount of aberration is present, the noise almost completely obliterates the signal. On the other hand, the compensated images $\hat{I}_\psi$ degrade only mildly even when both phase noise and aberration are present. This behavior is remarkable but also reasonable in view of the fact that $\hat{I}_\psi$ is the correlation of $H_\psi$ with $G_\psi$, meaning that any noise or aberration in $H_\psi$ that has low correlation with $G_\psi$ does not have significant contribution to the final image $\hat{I}_\psi$.

Note that this simulates noise in the detection system, not in the optical field itself. Noise in the optical field is accounted for as aberration if it is present at a plane conjugate to the interferometer mirrors. Noise or aberration away from the conjugate plane is not compensated by the present scheme of IDHAO, unless one sets up a multi-conjugate configuration, which may be possible borrowing some of the techniques available in conventional AO systems.

A series of experiments were performed to confirm the results of theoretical and simulation studies and to observe general behavior of the IDHAO process. First, to demonstrate the basic IDH with focusing property, the optical configuration of FIG. 2 was set up using a group of three red light emitting diodes (LEDs) at $z_1 = 650$ mm and another red LED closer at $z_1' = 440$ mm. All three lenses were of focal length $f_o = f_a = f_c = 100$ mm, while the curved mirror had a focal length of $f_B = 600$ mm. Various distances were set at $z_2 = 220$ mm, $z_3 = 200$ mm, $z_4 = 200$ mm, and $z_5 = 140$ mm, ±5 mm. A Pixelfly CCD camera having a 6.3×4.8 mm² sensor area with 640×480 pixels was used. This area projects to approximately a 60×45 mm² field of view at the object plane at $z_1$ from $L_o$. The plane mirror $M_A$ was piezo-mounted and driven with a sawtooth output of a digital function generator and four phase-shift interferograms were acquired at 20 fps. Hologram acquisition, reconstruction, and aberration compensation were performed using LabVIEW-based programs. The entire cycle took a few seconds, including file write/read and without any attempt to optimize the speed.

Figure 11:
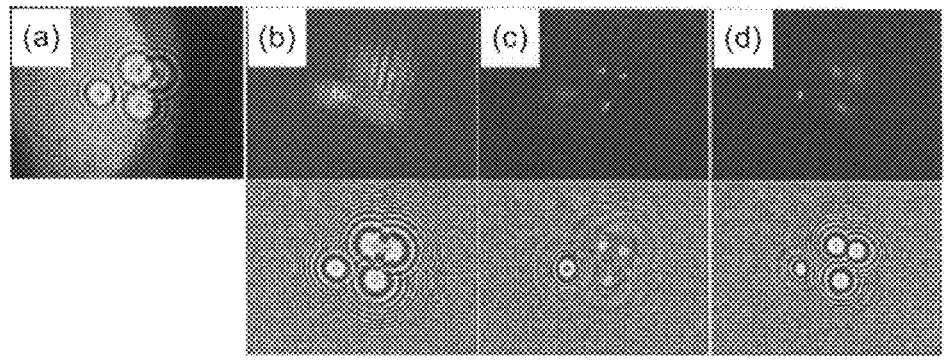
FIG. 11 illustrates IDH without aberration and includes images of (a) a raw hologram, (b) a complex hologram, (c) a reconstructed image at $z_i = 22000$ mm, corresponding to $z_1 = 650$ mm, and (d) a reconstructed image at $z_i' = 14870$ mm, corresponding to $z_1' = 440$ mm.

One of the raw holograms $h_\phi$ of the four-LED object field is shown in FIG. 11(a) and the corresponding complex hologram $H_0$ is shown in FIG. 11(b). One may note the slightly higher fringe frequency of the lower left LED compared to the other three LEDs because of its closer distance to the objective lens. Numerical propagation of the hologram focuses the LEDs at two separate distances, (c) at $z_i$=22000 mm and (d) at $z_i$=14870 mm, which values are consistent with the effective image distances projected to the object space. The image distances can be calculated by using Eq. (8) and geometrical optics consideration, and the approximately 10:1 lateral magnification corresponds to 100:1 longitudinal magnification.

Figure 12:
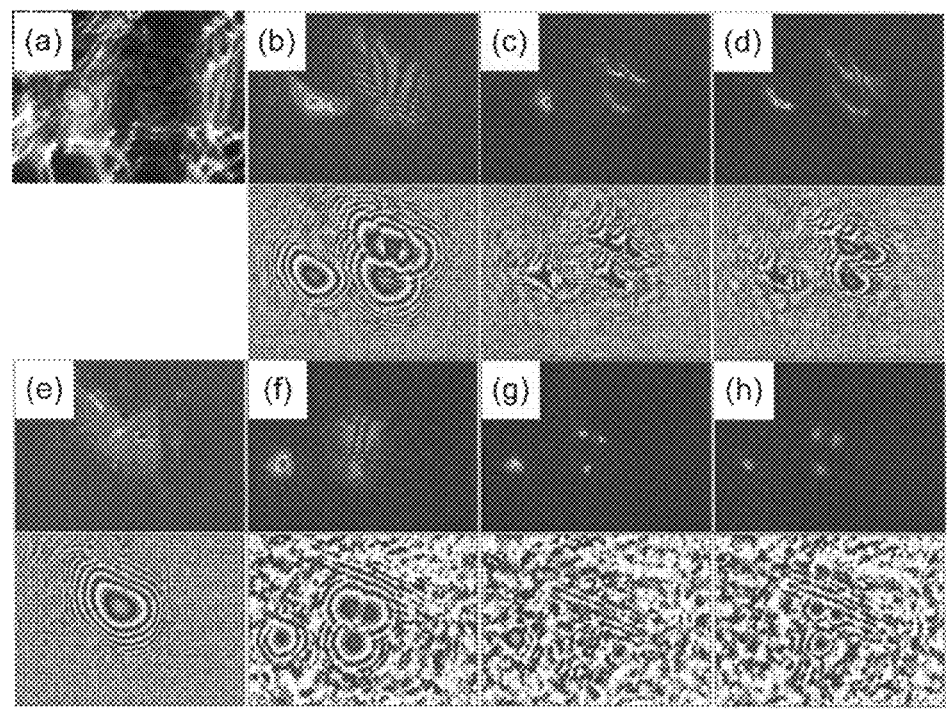
FIG. 12 illustrates IDHAO with a phase aberrator placed just behind the objective lens and includes images of (a) a raw hologram, (b) a complex hologram, (c) a reconstructed image at $z_i$, (d) a reconstructed image at $z_i'$; e) a guide star hologram of an LED, (f) a corrected hologram, (g) a corrected image at $z_i$, and (h) a corrected image at $z_i'$.

Phase aberrators were fabricated by coating optically clear plastic piece with acrylic paint to produce irregular surface profiles of varying degrees. An aberrator was placed just behind the objective lens $L_o$, and the resulting IDH images are shown in the upper row of FIG. 12. The concentric rings of FIGS. 11(a) and (b) were replaced with severely distorted patterns in FIGS. 12(a) and 12(b). An attempt to numerically focus the images from $H_\psi$ yielded the results shown in FIGS. 12(c) and 12(d) at the two expected image distances. A star hologram $G_\psi$ was acquired by aperturing the object field to leave only one of the LEDs on, in this case one belonging to the three-LED group at $z_1$=650 mm, as shown in FIG. 12(e). Aberration compensation using the guide star hologram, as described in theory and simulation, resulted in the corrected hologram $\hat{H}_\psi$ in FIG. 12(f) and the corrected images $\hat{I}_\psi$ in FIGS. 12(g) and (h). Note, as in the simulation of FIG. 4, that the distorted fringes in FIG. 12(b) are replaced with more concentric ones in FIG. 12(f). Note also that the guide star at $z_1$ is effective in compensating the images at both $z_1$ and $z_1'$. Another test, not presented, of using a guide star at $z_1'$ was equally effective in compensating the images at the two distances. That is, a guide star can be placed at any distance relative to the object volume. This is a unique property of IDHAO, which may not be available in other existing adaptive optics techniques.

Figure 13:
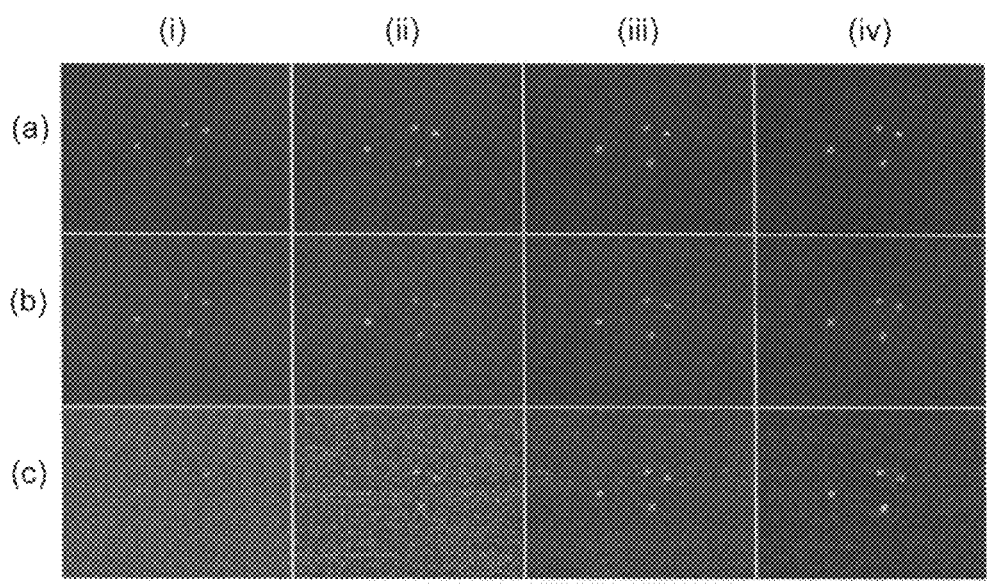
FIG. 13 illustrates IDHAO versus noise and includes images of (a)-(c) the object field with varying brightness obtained using (i) IDH without AO and (ii)-(iv) IDHAO with varying brightness of the guide star.

Next, the LED brightness was reduced to various levels to observe effects of noise and low signals on the IDH and IDHAO images. In FIG. 13, all four LEDs were placed at $z_1$=650 mm, which constitutes the object field. The leftmost LED, was also used as the guide star. No deliberate aberrator was in place. In each row of FIG. 13, the first image, column (i), is the reconstructed image $I_\psi$ without compensation, while columns (ii)-(iv) are the compensated images $\hat{I}_\psi$ with increasing brightness of the guide star. The rows (a)-(c) represent the object field with decreasing brightness. In all cases, the IDHAO process is seen to be capable of reducing the noise and increasing the contrast. Also significant to note is that the contrast enhancement increases with the guide star brightness. The effect is especially marked for the weakest signal in (c), where the uncompensated image is almost buried in background, but the brighter guide star brings out the signal with high contrast, while maintaining good resolution.

Figure 14:
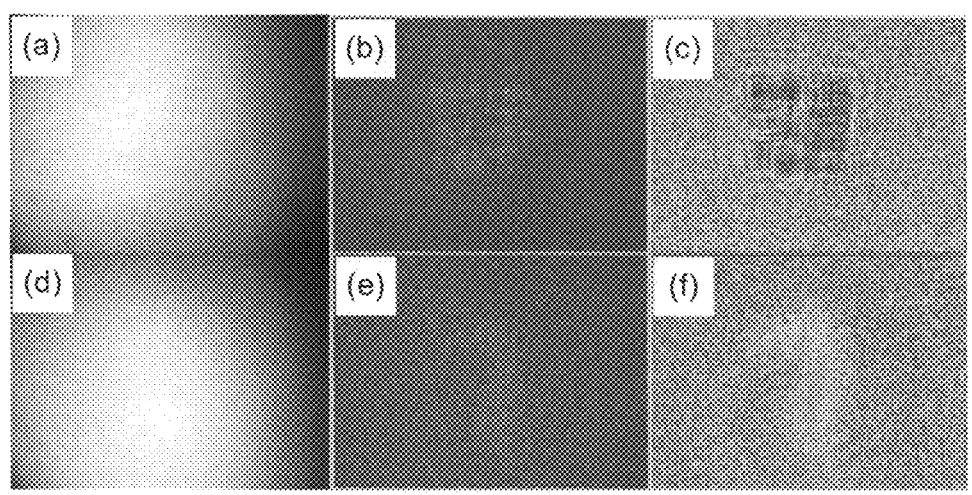
FIG. 14 illustrates IDH of extended objects and includes images of a resolution target (top row) and a knight chess piece (bottom row) illuminated with a miniature halogen lamp. In each case, a raw hologram and the amplitude and phase of the complex hologram are shown.

In addition to the point-like sources of LEDs, extended objects of finite surfaces were also used to test the IDHAO process. As shown in the top row of FIG. 14, a miniature halogen lamp illuminated a resolution target from behind through a piece of frosted glass, while in the bottom row, a knight chess piece was illuminated with the halogen lamp in front. The objects were at $z_1'$=450 mm. In both cases an interference filter, centered at 600 nm and of linewidth 10 nm, was placed in front of the camera to improve the interference contrast, although no significant difference in resulting images was noticed. In each case, a raw interferogram $h_\phi$ and the complex hologram $H_\psi$ are shown. Note that for these extended objects the raw interferograms only have barely recognizable interference contrast. No deliberate phase aberrator was present. An LED placed next to the objects at $z_1'$=450 mm served as the guide star.

Figure 15:
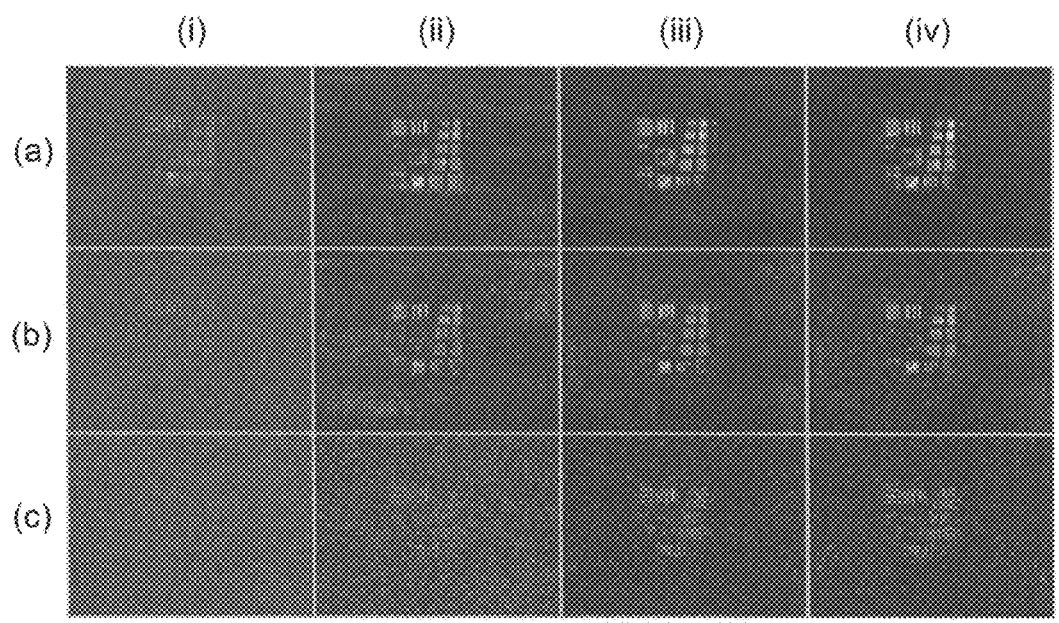
FIG. 15 illustrates IDHAO versus noise and includes images (a)-(c) of a resolution target with varying brightness obtained using (i) IDH without AO and (ii)-(iv) IDHAO with varying brightness of the guide star.

With reference next to FIG. 15, an experiment similar to that of FIG. 13 was carried out by varying the brightness of the halogen lamp and the guide star LED to various levels. Again, it was seen that the IDHAO process was quite effective in extracting and strengthening the image signals buried in background noise.

Figure 16:
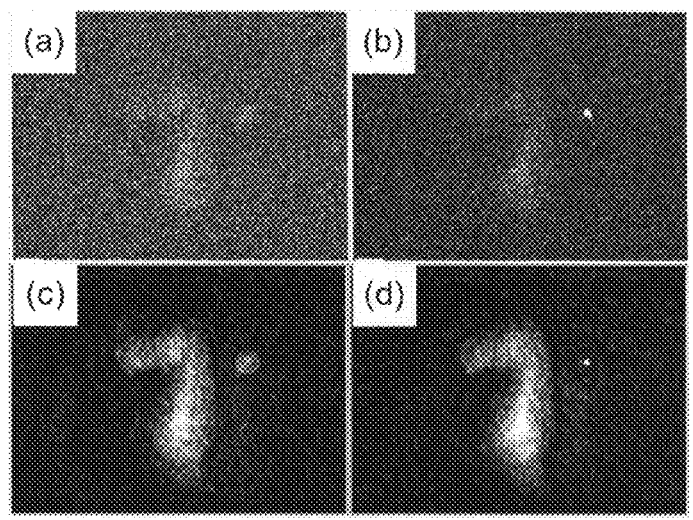
FIG. 16 illustrates three-dimensional focusing of IDHAO of an extended object and includes images of (a) an uncorrected image reconstructed at $z_i'=17500$ mm, corresponding to $z_1'=450$ mm, (b) a reconstructed image at $z_i=22000$ mm, corresponding to $z_1=650$ mm, and (c) and (d) corresponding images with compensation.

Finally, FIG. 16 shows that the IDHAO process is effective for a three-dimensional object volume, as was found for LED objects in the experiment of FIG. 12. In this experiment, an LED at $z_1$=650 mm was turned on in addition to the knight piece at $z_1'$=450 mm. The guide star LED was still at the same distance as the knight. In the corrected images of the bottom row, as well as the uncorrected images of the top row, the objects separately came into clear focus at the appropriate distances.

The disclosed incoherent digital holographic adaptive optics (IDHAO) method is an effective and robust means of compensating optical aberrations in incoherent optical imaging systems. A theoretical framework based on propagation of spherical waves from source points followed by integration of intensity over the object points correctly predicts the possibility of aberration compensation. General behavior of the theoretical model of IDHAO was investigated by simulation studies. The studies showed robust aberration compensation under various ranges of parameters, including aberration types and strength, as well as in presence of significant noise. Finally, experimental studies corroborated these predictions. The IDHAO process was seen to be effective for both point-like sources and extended objects. In particular, a brighter guide star is seen to be very effective in bringing out weak signals buried under noise, through the fact that the IDHAO signal is proportional to the auto-correlation of the complex guide star hologram.

The invention claimed is:

1. A method for generating an aberration-compensated image of an object field, the method comprising:
   generating a full-field complex hologram of the object field;
   generating a guide star complex hologram of a guide star selected from the object field;
   performing mathematical correlation between the guide star complex hologram and the full-field complex hologram; and
   generating from the correlation an aberration-compensated image of the object field.

2. The method of claim 1, wherein generating a full-field complex hologram comprises generating multiple raw interferograms of the object field and combining them to generate the full-field complex hologram.

3. The method of claim 2, wherein generating multiple raw interferograms of the object field comprises capturing phase-shifted interferograms of the object field.

4. The method of claim 3, wherein capturing phase-shifted interferograms of the object field comprises displacing a mirror along an optical axis of an interferometer used to generate the interferograms.

5. The method of claim 3, wherein capturing phase-shifted interferograms of the guide star comprises displacing a mirror along an optical axis of an interferometer used to generate the interferograms.

6. The method of claim 2, wherein generating multiple raw interferograms of the guide star comprises capturing phase-shifted interferograms of the guide star.

7. The method of claim 1, wherein generating a guide star complex hologram comprises generating multiple raw interferograms of the guide star and combining them to generate the guide star complex hologram.

8. A non-transitory computer-readable medium that stores an aberration compensation system comprising:
  logic configured to generate a full-field complex hologram of an object field;
  logic configured to generate a guide star complex hologram of a guide star selected from the object field;
  logic configured to perform mathematical correlation between the guide star complex hologram and the full-field complex hologram; and
  logic configured to generate from the correlation an aberration-compensated image of the object field from the correlation.

9. The non-transitory computer-readable medium of claim 8, wherein the logic configured to generate a full-field complex hologram is configured to combine multiple raw interferograms of the object field to generate the full-field complex hologram.

10. The non-transitory computer-readable medium of claim 9, wherein the logic configured to generate a full-field complex hologram is configured to combine multiple phase-shifted interferograms of the object field to generate the full-field complex hologram.

11. The non-transitory computer-readable medium of claim 8, wherein the logic configured to generate a guide star complex hologram is configured to combine multiple raw interferograms of the guide star to generate the guide star complex hologram.

12. The non-transitory computer-readable medium of claim 11, wherein the logic configured to generate a guide star complex hologram is configured to combine multiple phase-shifted interferograms of the guide star to generate the guide star complex hologram.

13. A method for generating an aberration-compensated image of an object field, the method comprising:
  generating a raw interferogram of the object field;
  generating a phase-shifted raw interferogram of the object field;
  combining the raw interferograms of the object field to generate a full-field complex hologram of the object field;
  generating a raw interferogram of a discrete feature in the object field;
  generating a phase-shifted raw interferogram of the discrete feature;
  combining the raw interferograms of the discrete feature to generate a guide star complex hologram of the discrete feature;
  performing mathematical correlation between the guide star complex hologram and the full-field complex hologram; and
  generating from the correlation an aberration-compensated image of the object field.

14. The method of claim 13, wherein generating a raw interferogram of the object field comprises receiving light waves from the object field with an interferometer, splitting the light waves, reflecting the split light waves off of two mirrors having different radii of curvature, and interfering the light waves reflected by the two mirrors on a camera.

15. The method of claim 14, wherein generating a phase-shifted raw interferogram of the object field comprises linearly displacing one of the mirrors along an optical axis of the interferometer, receiving light waves from the object field with an interferometer, splitting the light waves, reflecting the split light waves off of the two mirrors, and interfering the light waves reflected by the two mirrors on a camera.

16. The method of claim 14, wherein generating a phase-shifted raw interferogram of the discrete feature comprises linearly displacing one of the mirrors along an optical axis of the interferometer, receiving light waves from the discrete feature with an interferometer, splitting the light waves, reflecting the split light waves off of the two mirrors, and interfering the light waves reflected by the two mirrors on a camera.

17. The method of claim 13, wherein generating a raw interferogram of a discrete feature in the object field comprises obstructing the light waves from the object field so that only light waves from the discrete feature are received by the interferometer.

18. The method of claim 13, wherein generating a raw interferogram of the discrete feature comprises receiving light waves from the discrete feature with an interferometer, splitting the light waves, reflecting the split light waves off of two mirrors having different radii of curvature, and interfering the light waves reflected by the two mirrors on a camera.

* * * * *